INVENTORS
JON R FREDRICKS,
STEWART T SMYTHE,
BY
Berman, Davidson & Berman,
ATTORNEYS

United States Patent Office 3,793,420
Patented Feb. 19, 1974

3,793,420
AUTOMATIC INFINITELY ADJUSTABLE SIDE PLATE FOR TIRE CURING MACHINE
Jon R. Fredricks and Stewart T. Smythe, Louisville, Ky., assignors to International Rubber Industries, Inc., Jeffersontown, Ky.
Filed Sept. 17, 1971, Ser. No. 181,328
Int. Cl. B29h 17/00
U.S. Cl. 264—89
12 Claims

ABSTRACT OF THE DISCLOSURE

In the process of retreading pneumatic tires, a method for supporting a portion of the exterior of a pneumatic tire during vulcanization with fluid pressure, such that the tire is held in exactly the correct position within the mold or matrix so that fluid pressure in the interior of the tire exerts the proper force against the mold or matrix.

---

This invention relates to apparatus for retreading pneumatic tires, and more particularly to a tire curing apparatus having a matrix which is designed to receive tires having a range of variation in diameter and cross-section and to allow the tires to assume their natural cross-sectional configurations during curing.

It is widely known that in order to cure tires which vary in diameter and cross-section within a given matrix without distorting the tires, it is necessary to allow the beads of any tire cured in the matrix to settle in positions which will allow the uncured portion of the tire to seat in the matrix so that pressure is applied to the matrix equally over its entire surface. In general, some movement of the beads and side walls is necessary in order to properly cure tires of different sizes in the same matrix.

Tire retreading devices of the prior art provide for variations in the positions of the beads and the side walls of the tire either by using an inside curing rim and tube or bag which combine to apply pressure generally only to the portion of the tire which is to be cured, leaving the side walls and beads free of the matrix, or by the use of a road rim which grips the tire by the beads and must be mechanically adjusted for the proper bead setting and is used in conjunction with auxiliary plates (commonly known as pressure plates) to support the side wall portion of the tire which extends between the matrix and the rim and generally also uses an inside bag or tube. This type of apparatus, known as a bag and rim type of curing system, adds much weight to the tire, making the tire cumbersome and difficult to load and unload from the matrix.

Tire retreading devices of the prior art which operate without the use of bags and rims and are therefore known as bagless, rimless curing systems, use auxiliary plates and bead positioners which in effect are extensions of the matrix, making it necessary for the tire to fit in the matrix from one bead, across the side wall, around the tread area of the tire, down the other side wall, and to the other bead (bead-to-bead measurement). Such devices are generally not adjustable by any means except replacement, and therefore approximate the action of a road rim and pressure plate curing system with the exception that they are not adjustable for various diameters and cross-sections of tires. Tires of various diameters and cross-sections can be accommodated in a mold of given size by using a plurality of identical matrices, each with auxiliary plates and bead positioners of a different shape to effect a variation in the bead-to-bead measurement which may be accommodated.

It is therefore an object of this invention to provide a method for supporting the side wall of a pneumatic tire during vulcanization such that a range of tire sizes can be vulcanized within a given matrix. The range of sizes of tires includes variation in both tire diameter and tire cross-sectional dimension.

A main object of the invention is to provide a novel method of tire retreading in which the side of the tire is supported by infinitely adjustable fluid pressurized side plate means.

A more specific object is to provide an improved method of tire retreading in which the tire is allowed to assume its natural cross-sectional configuration during curing, under the influence of pressurized fluid.

A still further object is to provide an improved method of tire retreading in which a temporary differential in pressure is created between the inner side wall and outer side wall of the tire to allow the tire to assume its natural cross-sectional configuration.

A further object of the invention is to provide an improved method of curing retreaded tires within a wide range of variation in tire diameter and cross-section wherein movement of the beads and side walls of the tire under the influence of pressurized fluid allows the beads and side walls to assume their natural positions during curing, so as to cure a range of sizes of tires in the same matrix without stretching the tires to fit the matrix and without using a mechanical device to position the beads properly.

Another object is to provide novel apparatus for carrying out the improved method of this invention including non-sealing bead plates.

The method for supporting the side wall of the tire with fluid pressure can be more particularly described by describing a specific apparatus embodying the subject invention. However, it is contemplated that this method can be adapted to any apparatus using a mold or matrix to cure retreaded tires or new tires.

The apparatus includes a matrix in which the tire is placed and has fluid pressure-controlled bead-engaging discs acting against fluid pressure in the tire and fluid pressure acting against the outside side wall of the tire. The pressure on the outside of the side wall is allowed to approach equalization with the pressure in the tire during curing to allow the beads and side walls to assume their natural positions and to establish the correct configuration of the tire for proper curing.

The apparatus of the present invention accomplishes the desired movement of the beads and side walls into their natural positions by providing pneumatic supports for the side walls of the tire so that the fit of the tire in the matrix will permit the bead-engaging plates to move with the beads to their proper positions and the beads will remain seated against the bead-engaging plates. The rate of flow of the fluid within the tire in or out may be controlled and does not require any cumbersome accessory apparatus to be installed within or about the tire.

In effect, the apparatus of the present invention changes the auxiliary plate and bead positioners for every tire after the tire is inserted in the matrix by "custom-building" the auxiliary plate of fluid.

Further objects and advantages of the invention will become apparent from the following description and claims, and from the accompanying drawings, wherein:

Figure 1:
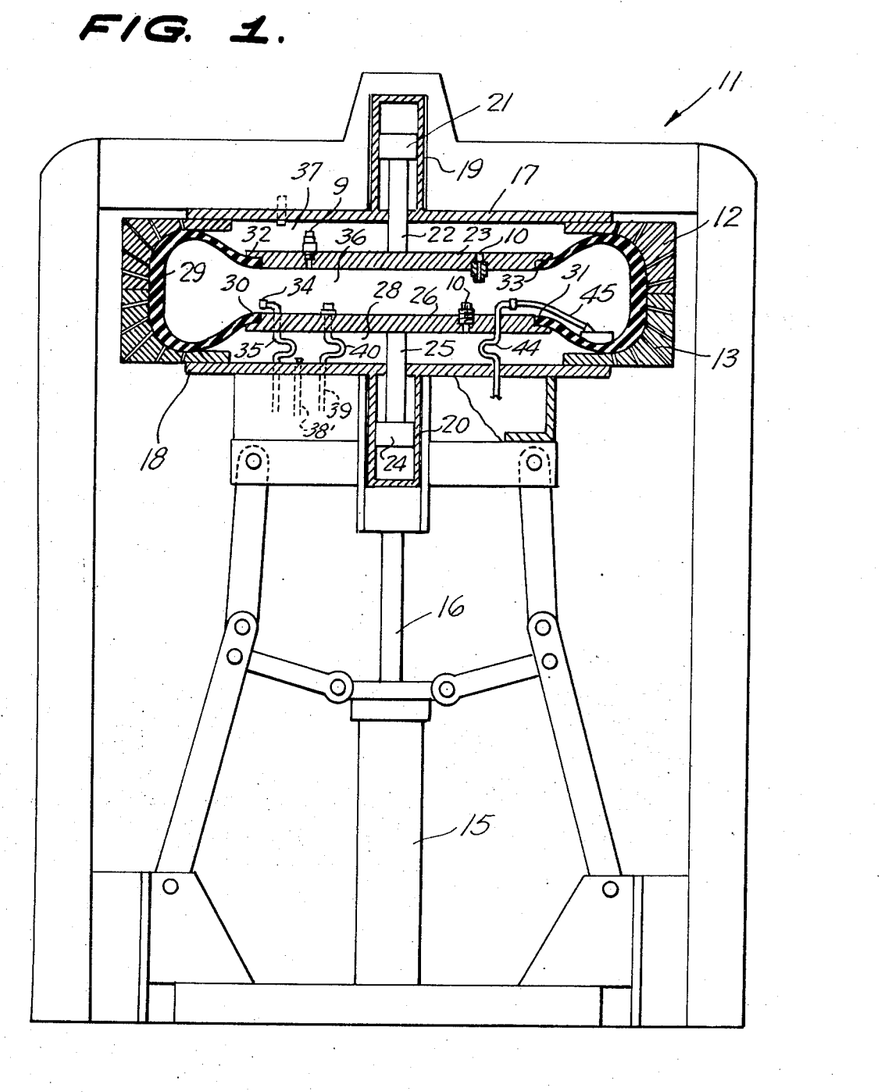
FIG. 1 is an elevational view, partly in cross-section, of a tire retreading apparatus having an improved mold assembly according to the present invention.

Referring now to FIG. 1 of the drawings, 11 generally designates the tire retreading apparatus which embodies the improved tire-curing structure in accordance with the present invention. The apparatus 11 comprises top and bottom cooperating tire-receiving matrix segments 12 and 13, the segments being annular as in the case of the top and bottom matrix segments of a conventional tire-retreading apparatus of the type disclosed, for example, in U.S. Pat. 3,184,794 to M. A. Sherkin or U.S. Pat. 3,465,385 to K. Zangl. The top matrix segment 12 may be stationary, whereas the lower matrix segment 13 may be vertically movable so that it can be lowered relative to the top segment 12, for inserting a tire between the segments or for removing a cured tire. The structure for raising and lowering the matrix segment 13 is conventional and forms no part of the present invention. The lower matrix segment 13 may be supported on linkage elements, as illustrated in FIG. 1, and the vertical movement of the matrix segment 13 may be performed by a fluid pressure cylinder 15 provided with a vertical piston having a piston rod 16 connected with plate 18 carrying matrix segment 13 so that the vertical movement of the piston rod 16 is transmitted to matrix segment 13. Conventional means are provided for controlling the pressure fluid admitted to cylinder 15 and for thereby controlling the vertical movement of the piston rod 16.

A metal plate or disc 17 is rigidly secured on the top rim of upper segment 12 and provides a top seal therefor. Similarly, a metal disc or plate 18 is secured to the bottom rim of lower matrix segment 13 and provides a bottom seal. Elements 12 and 17 may be formed integrally with each other, if so desired, as may elements 13 and 18.

Rigidly secured centrally to plate or disc 17 is an upstanding pneumatic cylinder 19 and rigidly secured centrally to the bottom disc or plate member 18 is a depending pneumatic cylinder 20. The top cylinder 19 is provided with a piston 21 having a vertical depending piston rod 22 which extends slidably and sealingly through the center of the top cover plate 17 and which is rigidly secured at the bottom end to the center of an upper tire bead-engaging disc member 23. Similarly, the lower pneumatic cylinder 20 is provided with a piston 24 having a piston rod 25 which extends slidably and sealingly through the center of the lower cover plate 18 and which is rigidly secured at its top end to the lower tire bead-engaging disc or plate member 26.

Disc members 23 and 26 are provided with annular shoulders 31 and 32, respectively, at their peripheries for engaging the beads 30 and 33 of a tire 29 placed in the matrix. With the tire in place, as shown in FIG. 1, it can be seen that upper outer chamber 37 and lower outer chamber 28 are defined. The boundaries of chamber 37 are formed by sealing plate 17, bead-engaging disc 23 and the upper side wall of tire 29, while the chamber 28 is similarly bounded by sealing plate 18, disc 26, and the lower side wall of tire 29. Inner chamber 36 is defined by the inner surfaces of bead-engaging discs 23 and 26 and the inner surface of tire 29.

Discs 23 and 26 are provided with passages 10 for interconnecting chamber 36 with chambers 37 and 28, and pop-off valve 9 is mounted on disc 23 for reasons which will appear more fully below in the description of the operation of the invention. Flexible conduits 35, 40 and 44 extend through plate 18 and disc 26 into inner chamber 36 in order to perform functions in connection with curing of the tire as will be explained more fully below in the description of FIG. 2.

Figure 2:
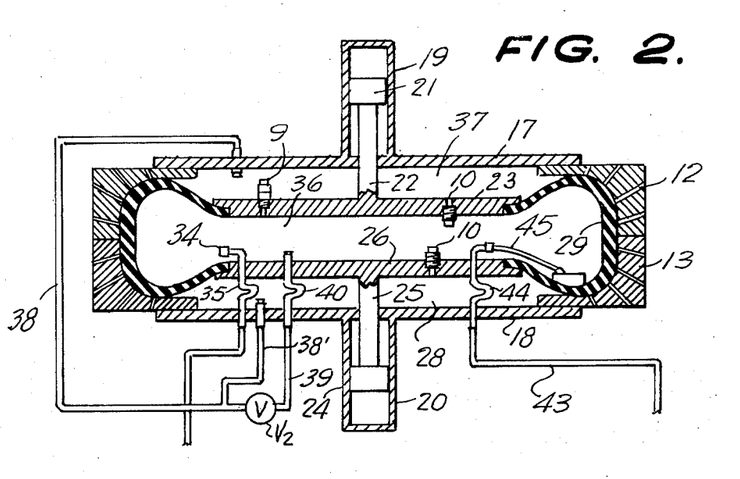
FIG. 2 is a schematic diagram showing the fluid connection of the mold assembly employed in FIG. 1.

As shown in FIG. 2, conduit 35 is provided with nozzle 34 at one end thereof in communication with chamber 36 while the other end is connected with a source of steam under pressure and a source of air through appropriate valving (not shown). Conduit 44 is provided at one end thereof with intake member 45 for removing condensation from the interior of tire 29 through return line 43 through appropriate valving (not shown). Conduit 40 is connected via lines 39 and 38 with chamber 37, thus providing communication between chambers 36 and 37, while communication between chambers 36 and 28 is provided by lines 38' and 39 through valve $V_2$. It is to be noted that lines 38' and 38 provide an interconnection between chambers 28 and 37.

The procedure for curing a tire, for example, the tire shown at 29 in FIGS. 1 and 2, consists in first opening the matrix assembly by lowering the lower segment 13 by means of the pneumatic control cylinder 15. The operator then places the tire 29 horizontally in the lower matrix segment 13 so that the bottom bead of the tire engages circumferentially in the recess 31 provided therefor at the periphery of the lower bead-engaging disc 26, the piston 24 and piston rod 25 being upwardly extended at all times. The cylinder 19 is then activated so that the piston rod 22 is extended downwardly. The main control cylinder 15 is activated to begin closing the matrix assembly, thereby elevating the lower matrix segment 13, which eventually causes the peripheral recess 32 of the upper bead-engaging disc 23 to receive and conformably engage the upper bead 33 of tire 29, thus interlocking the upper bead 33 with disc or plate 23.

Air under pressure is then injected through nozzle 34 to inflate the tire. As soon as the tire inflates, discs 23 and 26 begin to spread apart, overcoming the force exerted thereon by the fluid pressure in cylinders 19 and 20, because of the substantially greater surface area of discs 23 and 26 compared with that of pistons 21 and 24. Discs 23 and 26 are limited in their separation, since the upward movement of plate 23 is limited by the stroke of cylinder 19, and the downward movement of bead plate 26 is limited by the stroke of cylinder 20.

The separation of discs 23 and 26 and the corresponding separation of the tire beads 30 and 33 causes the outside diameter of the tire to be reduced. Once this reduction of the outside diameter has been accomplished, the matrix segments 12 and 13 can be closed by the continued activation of the main control cylinder 15, since the outside diameter of the tire will no longer be sufficient to interfere with the tread design portions of the matrix segments. Once the matrix segments are closed, they are locked by conventional locking apparatus defined by the linkage actuated by main control cylinder 15.

After the matrix is closed and locked, limit switch LS₁ (FIG. 4) energizes a valve (not shown) for introducing additional liquid or gas into the tire through nozzle 34, thus increasing the pressure in tire chamber 36. As the pressure in the tire chamber 36 increases, the fluid in chamber 36 will flow through passages 10 and/or lines 39, 38 and 38' into chambers 37 and 28. As the pressures in chambers 36, 37 and 28 reach equilibrium, discs 23 and 26 will move freely to the one unique position for the beads of tire 29 which will allow the uncured portion of the tire to seat properly in the matrix so that the heat and pressure of the matrix are equally and properly applied to the tire.

Figure 3:
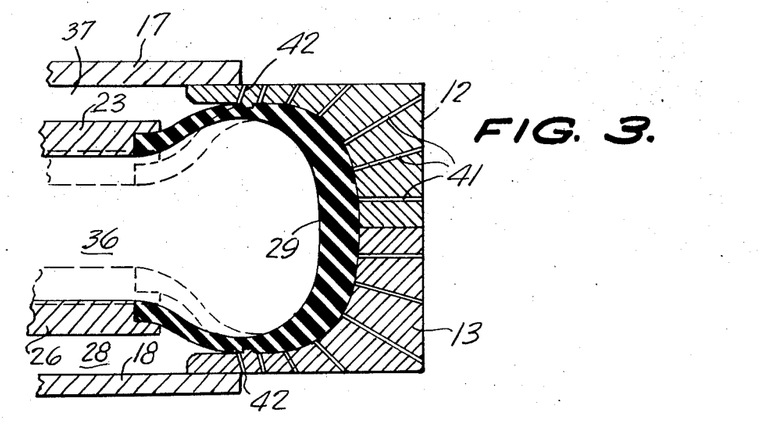
FIG. 3 is an enlarged fragmentary vertical cross-sectional view taken through a side portion of the mold assembly shown in FIG. 2.

The proper seating of tire 29 can be more readily understood by reference to the enlarged view shown in FIG. 3. Conventional vent holes, shown at 41 are located throughout the tread design portion of the matrix segment so that any air trapped under the tread can be expelled to the atmosphere when the tire 29 is inflated. The matrix segments are also provided with outer vent holes 42 adjacent the side wall of the tire so that inflation of the tire forces the side wall to close the vent holes. When the outermost vent holes 42 are sealed, chambers 37 and 28 are fully enclosed.

As fluid or gas enters the tire chamber 36 through nozzle 34 and the pressure in the tire chamber 36 increases, the fluid or gas is forced into the chambers 28 and 37 through passages 10. (It should be realized that passages 10 and interconnecting lines 39, 38 and 38' need not both be used; preferably only passages 10 are employed.) The restriction in passages 10 causes the transfer of pressure from chamber 36 to chambers 37 and 28 to be delayed so that the pressure in chambers 37 and 28 is below the pressure in tire chamber 36 during the time that the tire is being inflated to the proper pressure for curing. Shortly after the tire 29 reaches the desired curing pressure, chambers 37 and 28 will approach the same pressure and discs 23 and 26 will move to the position which causes the tread portion of the tire to fit the matrix exactly. At the same time, the beads on the tire relax into their natural positions (shown in dotted view in FIG. 3) as determined by the size of the tire 29 and the size of the matrix segments 12 and 13. This action will occur because once the pressure in chamber 36 approaches equalization with the pressure in chambers 37 and 28, the side wall assumes its natural position with discs 23 and 26 remaining in contact therewith under the influence of cylinders 19 and 20.

Cylinders 19 and 20, which are continuously activated, will be unable to force discs 23 and 26 together more than is desirable because the pressure within the tire forcing the tire against the matrix in the proper manner will be transmitted to the beads and the bead plates through the cord body of the tire and this force will exceed the force exerted by cylinders 19 and 20. The function of the cylinders at this point is to maintain the contact between discs 23 and 26 and their associated beads. This is necessary because the pressures between chambers 36, 37 and 28 will only temporarily equalize for the great majority of tire sizes which can be cured properly in the matrix.

The temporary pressure equalization will now be explained. Since retread matrices are made to cure a range of tire sizes, nomally when the tire is seated properly in the matrix, the tire itself is in an unnatural position with the side wall of the tire near its shoulder "spread" in relation to its natural shape. When the pressures in chambers 36, 37 and 28 become equal, the tire is unrestricted and the cord body attempts to return to its natural shape, thus moving the side wall away from the vent holes 42. This allows the fluid in chambers 37 and 28 to escape, thus reducing the pressure therein. When the pressure in chambers 37 and 28 drops, the higher pressure in chamber 36 will force the side wall back into the position where it covers the vent holes 42. At this time, the pressure in chambers 37 and 28 will begin to equalize with that in chamber 36 as the fluid passes through passages 10. When the pressures in chambers 37, 28 and 36 are equal, the side wall of the tire will come away from the vent holes 42 and the cycle will repeat. The purpose, therefore, of providing a pressure differential between chambers 37 and 28 on one hand and chamber 36 on the other is to keep the tire in exactly the correct position in relation to the matrix for providing a perfectly cured tire.

There will be only one case in which the pressure between chambers 37 and 28 and 36 will become equal and remain equal. That will occur when the size of the tire 29 is the same as that for which the retread matrix is nominally dimensioned. In this case, once the pressures of chambers 37 and 28 and 36 become equal, they will remain equal because there will be no force created by the tire carcass which would bring the carcass away from the vent holes 42. Therefore, there will be one size of tire in the wide range of sizes that can be cured in any matrix which will achieve a constant state of equilibrium in pressure between chambers 37 and 28 and 36.

It can thus be seen that the side wall of tire 29 will be supported by an infinitely adjustable fluid support during the curing process and that the tire will remain in the precise position for accurate tread alignment. The remainder of the curing process will be described below in connection with the description of FIG. 4.

Figure 6:
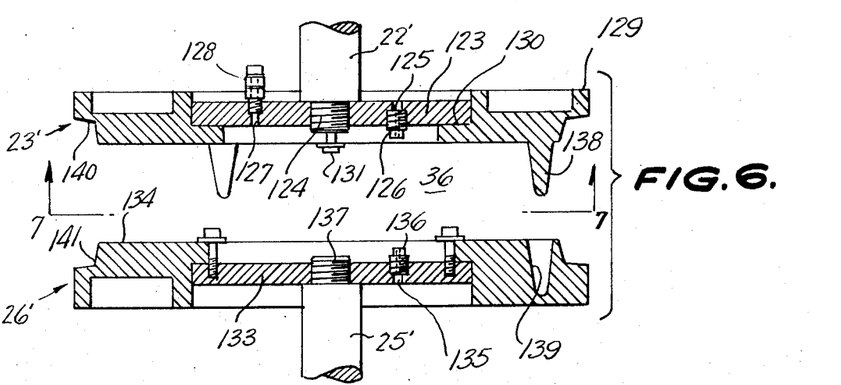
FIG. 6 is a vertical cross-sectional view taken through the bead disc assemblies of a further form of tire retreading apparatus according to the present invention.
Figure 7:
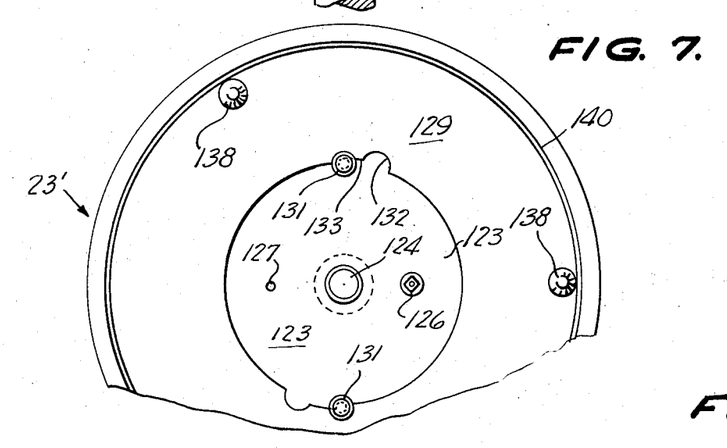
FIG. 7 is a fragmentary horizontal plan view taken substantially on the line 7—7 of FIG. 6.

FIGS. 6 and 7 illustrate another embodiment of the present invention which employs cooperating upper and lower bead disc assemblies 23' and 26' of somewhat different construction than the bead assemblies 23 and 26 employed in the previously described embodiment of the invention. Thus, the upper bead disc assembly 23' comprises a central main supporting disc 123 which is threadedly secured centrally to the lower end of the depending piston rod 22' associated with the upper pneumatic cylinder 19, the piston rod 22' being provided with a reduced threaded boss 124 which threadedly engages the center of the disc 123. Disc 123 is provided with an orifice 125 in which is mounted an orifice plug 126 having a restricted passage. Disc 123 is provided with another orifice 127 in which is mounted a "pop-off" valve 128 acting as a relief to prevent excessive pressure build-up in the space 36, compared to the pressure in the space 37. Clampingly secured to the supporting disc 123 is the upper ring member 129 which is dimensioned in accordance with the size of the tire to be processed. The ring 129 is formed with an annular seat 130 in which the periphery of disc 123 is engageable and is clampingly secured to the disc 123 by diametrically opposed flanged bolts 131 threadedly engaged with the inner periphery of ring 129. The inner periphery of ring 129 is provided with diametrically opposed half-keyholed notches having semicircular head portions 132 which can clear the flanged heads of the bolts 131 and having shallower stem portions 133 at which said flanged heads can clampingly and lockingly engage. The ring can be fastened to the disc 123 by first raising it beneath the disc with the flanged heads of the bolt 131 passing through the semicircular notch portions 132, after which the ring is rotated to engage the bolt heads in the shallow notch portions 133. Subsequently, the bolts can be tightened to complete the clamping connection of ring 129 to disc 123.

The lower bead disc assembly 26' is similar in construction to the upper assembly 23' and comprises a central disc member 133 to which ring 134 is attached in the same manner as described in connection with the upper bead-engaging disc assembly 23'. The lower central disc 133 is provided with an orifice 135 in which is mounted an orifice plug 136 similar to the orifice plug 126. The disc 133 is centrally secured by being threadedly engaged on an upstanding threaded stud 137 provided on the top end of the piston rod 25' associated with the bottom cylinder 20.

The upper adapter ring 129 is provided with a plurality of spaced depending guide tongues 138 which are registrable with and receivable in correspondingly shaped recesses 139 provided in the lower adapter ring 134. The purpose of elements 138 and 139 is to ensure that the beads of the tire are accurately engaged by rings 129 and 134 even if the bead is bent or distorted. Rings members 129 and 134 are provided with peripheral recesses 140 and 141 adapted to conformably receive the opposing beads of a tire to be processed.

The operation of the apparatus employing the bead disc assemblies 23' and 26' of FIGS. 6 and 7 is similar to that previously described in connection with the previously disclosed form of the invention. The equalization flow of fluid takes place through the orifice plugs 126 and 136 and allows the tires to assume their natural cross-sectional configurations during curing in the same manner as in the previously described form of the invention.

Figure 8:
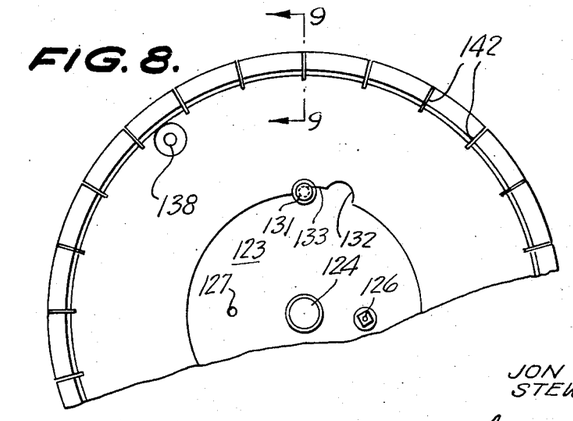
FIG. 8 is a fragmentary horizontal plan view similar to FIG. 7 but showing a still further form of bead disc assembly which may be employed in a tire retreading apparatus according to the present invention.
Figure 9:
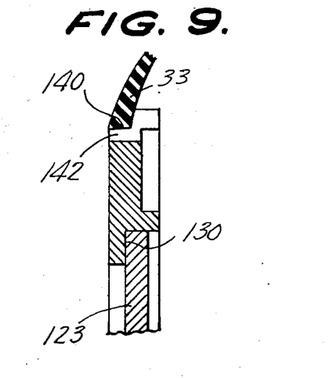
FIG. 9 is an enlarged fragmentary cross-sectional view taken substantially on the line 9—9 of FIG. 8, showing part of a tire bead engaged on the rim of the assembly.

FIG. 8 illustrates a modification of FIGS. 6 and 7 wherein rings 129 and 134 are provided at their peripheries with radial slots 142 extending inwardly from the peripheries of the bead-engaging elements a sufficient distance so that they extend inwardly beyond the beads of the tire when the beads are engaged in the recesses 140 and 141. Radial slots 142 may be employed in place of or in addition to orifices 126 and 136 or passages 10 in FIGS. 1 and 2 to ensure that fluid may pass freely between chambers 37 and 28 and 36.

Figure 5:
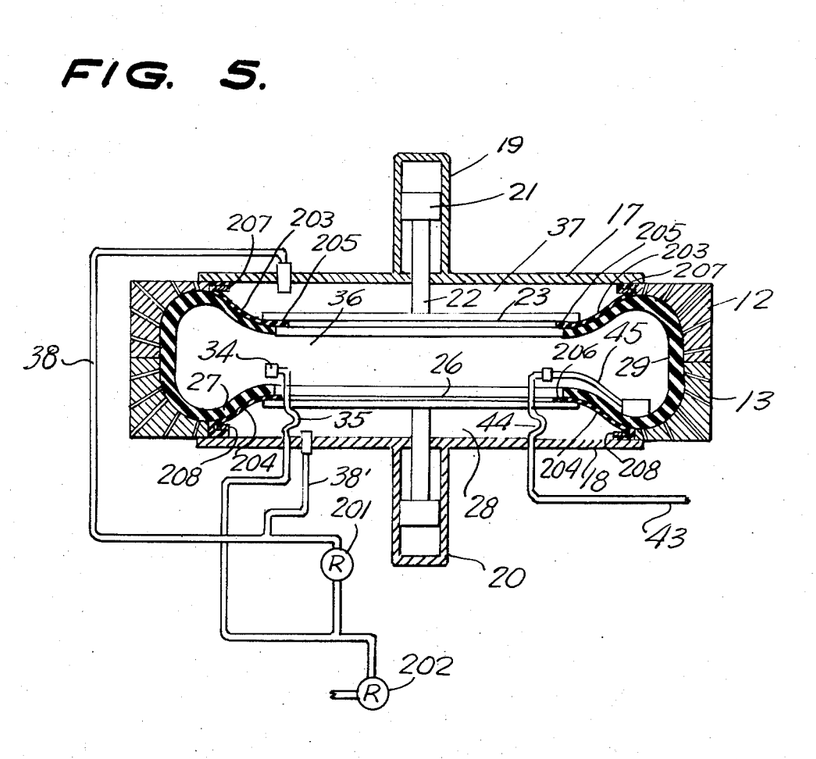
FIG. 5 is a schematic diagram, similar to FIG. 2, showing a modification of the apparatus of the present invention.

The system shown in FIGS. 1 and 2 may be modified as shown in FIG. 5 so as to construct the apparatus without the radial slots 142 or passages 10 so that the chamber 36 is independent of the chambers 37 and 28. In this modification, conduit 38 leading to chambers 28 and 37 is connected through an appropriate valve (not shown) to a source of pressurized liquid or gas (not shown). The inflation of chambers 36, 37 and 28 is accomplished by employing pressure regulator 201 in association with the valve connected to conduit 38 and another pressure regulator 202 in association with the conduit 35 leading to the nozzle 34. These regulators are set to achieve near equilibrium between chambers 36, 37 and 28, but the restriction defined by the relatively small conduit 38 would provide for a delay in the build-up of pressure in chambers 37 and 28 in relation to the build-up of pressure in chamber 36.

In operation, the bead plates are held in their proper positions in the same manner as previously described except that instead of using the action of the side wall to maintain a pressure differential between chamber 36 and chambers 37 and 28, the pressure differential is maintained by setting the conventional pressure regulator 201 at a slightly lower pressure than conventional pressure regulator 202. Thus, the pressure of chamber 36 would never become exactly equal to the pressure of chambers 37 and 28 and no venting of fluid from chambers 37 and 28 is necessary.

The embodiment of FIG. 5 may optionally include flexible membranes 203 and 204 disposed respectively in chambers 37 and 28. Membrane 203 is secured by notches 205 in disc 23 and attaching ring 207 while membrane 204 is secured by notches 206 in disc 26 and attaching ring 208. When membranes 203 and 204 are pressurized, support for the side walls of the tire during the curing process is provided by the fluid pressure in the membranes, rather than by fluid pressure alone. However, the operation is precisely the same either with or without the membranes.

In the case of the above-described modification, wherein chamber 36 is independent of chambers 37 and 28, the inclusion of the return line 43 and its associated elements 44 and 45 would make it possible to inflate the chamber 36 with a liquid or gas material different from the liquid or gas material used to inflate the chambers 37 and 28.

With the above-described modification, the air trapped in the tire when the tire is loaded in the matrix and interlocked with the bead discs, must be expelled through the return line 43. This would be accomplished as the tire is inflated with the liquid or gas material desired to be employed in the chamber 36 during cure.

Return line 43 may be connected to any desirable point in the chamber 36 to facilitate the removal of the liquid or gas used to inflate the tire. The expulsion of this fluid will allow the tire to be pressurized with liquid or gas until the pressure required to cure the tire is achieved, by closing return line 43 or by diverting return line 43 into a pressure vessel, pump or compressor which can recirculate the liquid or gas through chamber 36 under pressure sufficient for curing.

A further possible modification of the apparatus of the present invention is the use of return line 43 only as a means to evacuate a liquid or gas admitted into the chamber 36 solely for the purpose of heating chamber 36 to curing temperature. In this case the liquid or gas will discharge from the chamber 36 through return line 43 with the only pressure in the chamber 36 being achieved as the result of the pressure created by the resistance to flow of return line 43. After such liquid or gas has been admitted through nozzle 34 and has been expelled through the return line 43, the return line 43 is closed and the chamber 36 is inflated to the pressure required to cure the tire.

It is contemplated wtihin the spirit of the present invention to employ matrices having matrix segments without tread designs so that the apparatus can be used merely to cure precured treads to tires without the necessity of forming tread designs.

Figure 4:
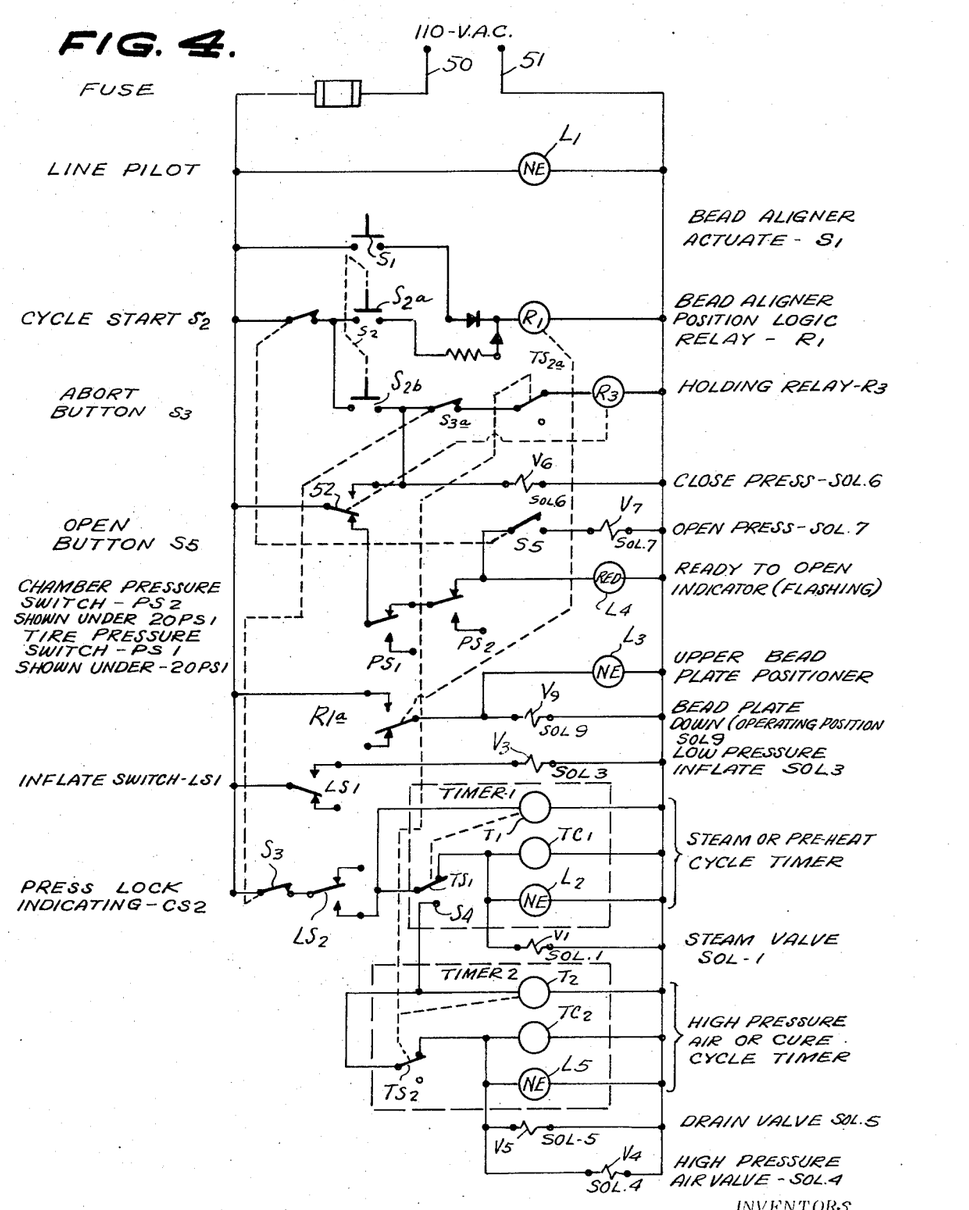
FIG. 4 is an electrical wiring diagram showing the electrical connections of the components of the elements employed in the apparatus of FIGS. 1 to 3.

FIG. 4 is a schematic wiring diagram of a typical control circuit for electrical elements employed in the system shown in FIGS. 1 and 2. Thus, referring to the electrical wiring diagram of FIG. 4, assuming the machine to be in an operating condition at rest, the circuit of FIG. 4 is connected to a suitable supply source at the supply wires 50, 51, causing a pilot light $L_1$ to become energized. With the matrix assembly open, as previously described, a tire is placed in the lower segment 13 with inlet nozzle 34 positioned substantially in the manner shown in FIG. 2. The operator then actuates the double-pole switch $S_2$, which is the cycle-start switch. This switch is of the conventional button-actuated type which is arranged so that its contacts remain closed only as long as pressure is exerted on its operating button.

The closure of the lower switch segment $S_{2b}$ of the cycle-start switch $S_2$ energizes a holding relay $R_3$ and raises its associated switch pole 52 to engage an upper relay contact and to establish a holding circuit for the relay $R_3$, as well as to energize the press-closing winding of a conventional four-way hydraulic valve $V_6$, $V_7$ (not shown). The elevation of the pole 52 of relay $R_3$ energizes the $V_6$ segment of said four-way valve to cause fluid to be admitted into the cylinder 15 in a manner to elevate the matrix segment 13, whereby the press starts to close.

The closure of the upper contacts $S_{2a}$ of switch $S_2$ energizes and unlatches a relay $R_1$, of a conventional latching type. This energization of relay $R_1$ closes its contacts $R_{1a}$ and energizes the solenoid valve $V_9$ (not shown) and the associated pilot lamp $L_3$. This lowers upper bead disc 23. When the discs 23 and 26 are approximately four inches apart, a limit switch $LS_1$ is closed, causing conventional solenoid valve $V_3$ (not shown) to be energized, admitting fluid under relatively low pressure, namely, approximately 15 pounds per square inch, into the tire through nozzle 34.

The function of the pilot lamp $L_3$ connected in parallel with the bead plate solenoid control valve $V_9$ is to inform the operator that the discs 23, 26 are in proper positions for tire curing.

As the press closes, a limit switch $LS_2$ closes, energizing the motor of a first timer $T_1$, its associated clutch $TC_1$, a neon lamp $L_2$ and the solenoid valve $V_1$, admitting steam into the tire through nozzle 34. After a short period of approximately 75 seconds, the pole $TS_1$ of a timer-operated switch swings from its upper position, shown in FIG. 4, to a lower position, engaging a lower contact 54. Under these conditions the clutch $TC_1$ stays engaged, whereas the timer motor $T_1$, the lamp $L_2$ and the conventional solenoid valve $V_1$ (not shown) become deenergized.

The engagement of the switch pole $TS_1$ with lower contact 54 energizes the motor of a second timer $T_2$, its associated clutch $TC_2$, a pilot lamp $L_5$, the conventional solenoid valve $V_5$ (not shown) and the conventional solenoid valve $V_4$ (not shown). The valve $V_5$ is a normally open drain valve provided in the return line 43, whereby the valve $V_5$ closes at this point to allow inflation pressure to be maintained in the tire 29. The energization of the solenoid valve $V_4$ admits high pressure (for example, 145 pounds per square inch) fluid into the tire through conventional shuttle valves and nozzle 34.

The cycle can be aborted at this stage, if necessary, by operating a manually controlled switch $S_3$, which opens the circuit of timer $T_2$ and releases the holding relay $R_3$ at the contacts $TS_{2a}$.

After timer $T_2$ times out, which, in the above-described typical embodiment, occurs after a period of the order of 16.5 minutes, the timer switch $TS_2$ opens and the lamp $L_5$, the timer motor $T_2$ and solenoid valves $V_5$ and $V_4$ become deenergized, opening the drain conduit 43 and shutting off the high pressure fluid. Timer switch $TS_{2a}$ also opens, releasing relay $R_3$, deenergizing the main press valve segment $V_6$ and energizing the signal lamp $L_4$. At this point in the cycle of operations, the operator would be approaching the machine, and if it should be noted that the red lamp $L_4$ were energized, he would check the pressure gauges on the press to see that the tire pressure was truly below 20 pounds per square inch. The operator would then close a switch $S_5$, thus energizing the main press solenoid valve segment $V_7$ to thereby open the main press.

It should be noted that the main press valve assembly $V_6$, $V_7$ is a conventional four-way, dual winding valve connected between the high pressure fluid source at the opposite ends of the main press cylinder 15.

Upon the unlocking movement of the main press lower segment 13, the limit switch $LS_2$ opens, releasing the timers 1 and 2 and allowing them to reset automatically.

All during the cycle, the solenoid valve $V_3$ had been energized (maintaining the valve open) but the air passing through the valve $V_3$ had been shuttled out of the mold by the action of a conventional shuttle valve under the higher fluid pressure going through valve $V_4$. As the air pressure in the tire drops to the order of 15 pounds per square inch, air again begins to flow from the fluid branch containing valve $V_3$ into the tire, and the pressure in the tire is thereby maintained at 15 pounds per square inch. Thus, as the press opens, the tire is maintained at 15 pounds per square inch and is spread by this pressure to thereby help clear it from the mold. This air pressure in the tire also helps to flush out any remaining steam and water from the inside of the tire.

As the press opens past the actuating point for the limit switch $LS_1$, solenoid valve $V_3$ becomes deenergized, which occurs at approximately the time that the press becomes fully open. At this time, the tire becomes substantially fully exhausted of air and releases itself by gravity from the upper bead plate 23. The operator then operates switch $S_1$, which latches relay $R_1$, thereby deenergizing solenoid valve $V_9$ and lamp $L_3$, causing the upper disc 23 to become elevated so that it does not interfere with the removal of the cured tire. After the cured tire has been removed, it may be replaced by another tire and the above-described cycle may then be repeated.

While certain specific embodiments of an improved apparatus for curing tires have been disclosed in the foregoing description, it will be understood that various modifications within the spirit of the invention may occur to those skilled in the art. Therefore, it is intended that no limitations be placed on the invention except as defined by the scope of the appended claims.

We claim:

1. A method of curing tires wherein a tire is placed in a mold for curing, comprising the steps of: forming a first sealed fluid pressure chamber including as a wall portion thereof a flexible portion of the exterior area of the tire, forming a second sealed fluid pressure chamber inside the tire, establishing a fluid pressure differential between said first and second fluid chambers, and controlling the relative fluid pressures in said first and second chambers during the curing process, so as to cause the tire to substantially exactly fit the mold throughout the curing process.

2. The method of claim 1 and further including the step of employing the side wall of the tire in cooperation with the mold to form a seal therewith in a manner to maintain the desired relationship between the fluid pressures in said first and second chambers.

3. The method of claim 2, and wherein movement of the side wall of tire is utilized to form the seal maintaining said desired relationship between the fluid pressures in said first and second chambers.

4. A method of properly positioning a tire in a matrix prior to curing in which a portion of the tire is structurally unsupported, comprising the steps of:
    (a) forming a first sealed fluid chamber on one side of said tire;
    (b) forming a second sealed fluid chamber on the opposite side of said tire;
    (c) forming a third sealed fluid chamber within said tire;
    (d) applying fluid under pressure to said third fluid chamber;
    (e) applying fluid to said first and second chambers under a pressure lower than that applied to said third fluid chamber;
    (f) causing the pressures in said first and second fluid chambers to become nearly equal to that in said third fluid chamber prior to curing; and
    (g) allowing said unsupported portion of the tire to move to its natural position so as to optimally position the tire for curing.

5. The method set forth in claim 4 wherein said portion of the tire comprises the side wall.

6. The method set forth in claim 5 further including the step of creating a fluid pressure differential between the interior of said tire and an external portion of the side wall of said tire, so that said portion of the side wall is supported by fluid.

7. The method set forth in claim 4, wherein the steps of forming said first and second sealed fluid chambers comprise the step of utilizing a portion of said tire to seal said first and second fluid chambers from a source of pressure lower than that in said tire.

8. The method set forth in claim 7 wherein said source of lower pressure is the atmosphere.

9. The method set forth in claim 7, further including the step of causing said portion of the tire to temporarily unseal said first and second chambers so as to cause a temporary pressure differential between said first and second chambers and said third chamber, to maintain said tire in the optimum position for curing.

10. The method set forth in claim 4, wherein said step of causing the pressures in said first and second fluid chambers to become nearly equal is effected by causing fluid to pass from said third chamber into said first and second chambers.

11. The method set forth in claim 4, wherein said step of causing the pressures in said first and second fluid chambers to become nearly equal is effected by applying pressurized fluid to said first and second chambers through a first conduit and to said third chamber through a second conduit and regulating the pressure applied through said conduits.

12. The method set forth in claim 7, wherein said step of causing the pressures in said first and second fluid chambers to become nearly equal is effected by causing fluid to pass from said third chamber into said first and second chambers.

References Cited
UNITED STATES PATENTS

| | | | |
|---|---|---|---|
| 3,184,794 | 5/1965 | Sherkin | 425—19 |
| 3,277,532 | 10/1966 | Hutchinson | 425—24 |
| 2,989,779 | 6/1961 | White | 425—42 |
| 3,135,996 | 6/1964 | Smyser | 425—24 |

ROBERT F. WHITE, Primary Examiner

T. E. BALHOFF, Assistant Examiner

U.S. Cl. X.R.

156—96, 110; 264—36, 94, 326; 425—24, 58